United States Patent [19]

Clarke

[11] Patent Number: 4,560,236

[45] Date of Patent: Dec. 24, 1985

[54] COLOR VARYING REFLECTOR

[76] Inventor: Ronald A. W. Clarke, 501 Wilkins St., #717, London, Ontario, Canada, N6C 5G2

[21] Appl. No.: 570,191

[22] Filed: Jan. 12, 1984

[30] Foreign Application Priority Data

Jan. 12, 1983 [CA] Canada .................................. 419300

[51] Int. Cl.$^4$ ............................................... G42B 5/48
[52] U.S. Cl. ..................................... 350/102; 350/97; 350/615; 350/642
[58] Field of Search ................. 350/97, 102, 290, 299, 350/132, 311, 317

[56] References Cited

U.S. PATENT DOCUMENTS 3,374,044 3/1968 Benson ................................ 350/102

Primary Examiner—John K. Corbin
Assistant Examiner—William Propp
Attorney, Agent, or Firm—R. Craig Armstrong

[57] ABSTRACT

A reflector element which reflects different colored signals back towards a light source, depending on which side of a center plane the source is positioned, is disclosed. Reflective surfaces parallel to and equidistant from the imaginary center plane face each other. A third reflective surface is adjacent to, abuts, and is perpendicular to the other two reflective surfaces. Optionally, a fourth reflective surface is adjacent to, abuts, and is perpendicular to the other three reflective surfaces. Some or all of the reflective surfaces on one side of the center plane are tinted, and some or all of the reflective surfaces on the other side of the center plane may be differently tinted.

8 Claims, 2 Drawing Figures

COLOR VARYING REFLECTOR

BACKGROUND OF THE INVENTION

1. Field of the Invention

This invention relates generally to reflectors, and particularly to a color varying reflector, i.e. a reflector which returns different colors of light depending on whether the source is on one side or the other of a center line or plane passing through the reflector.

It has long been recognized that there would be a use for such reflectors. There are obvious applications in, for example, highway and airport traffic control. There are many situations in which it is useful to use a light source and such a reflector to receive an indication as to whether one is on one side or the other of a center line or plane. Combining reflectors in different locations may also permit specific locations to be identified, through triangulation techniques. Reflectors may be mounted on a post, or embedded at road, runway or taxiway level, or positioned in any other suitable manner.

2. Description of the Prior Art

In the prior art, numerous attempts have been made to produce reflectors which return different signals to the source depending on the position of the source. In the simplest case, reflector units have been constructed consisting of differently colored reflectors on front and rear faces, thus reflecting different colors to sources opposed at 180 degrees to each other from the reflector. Such reflectors have been used, for example, to provide a red reflection from headlights of highway traffic approaching the reflectors from one direction and a green reflection to traffic approaching from the other direction. Such reflectors obviously cannot make fine angular distinctions, however, such as between sources of light which may be separated by as little as 45 degrees or less, for example.

Other attempts in the prior art have employed means such as blinders projecting from the reflective surfaces towards the source, to shade one portion or another of the reflective elements depending on the angular position of the light source. The effectiveness of such units is obviously limited by the distance to which the blinders project from the reflectors, and such projections are susceptible to damage.

It is an object of the present invention to provide a color varying reflector which is relatively simple and effective, and which offers advantages over color varying reflectors in the prior art.

SUMMARY OF THE INVENTION

In accordance with one aspect of the present invention there are provided first and second reflective surfaces facing each other in parallel, equidistant from and parallel to an imaginary center plane. A third reflective surface is positioned to face perpendicularly and abut both first and second reflective surfaces. At least one of the reflective surfaces is tinted on one side or the other of the center plane.

In accordance with a further aspect of the invention, there is further provided a fourth reflective surface, positioned to face perpendicularly and abut each of the other reflective surfaces.

DESCRIPTION OF THE DRAWINGS

The invention will now be more particularly and clearly described with reference to drawings of the invention, in which.

DESCRIPTION OF THE PREFERRED EMBODIMENT

Figure 1:
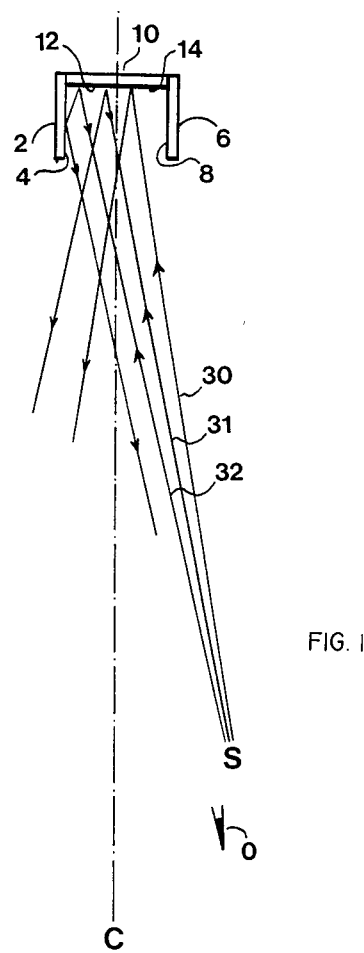
FIG. 1 is a plan view of a simple embodiment of the invention, illustrating the principle of the invention.

FIG. 1 shows the simplest embodiment of the invention. A first plate 2 faces a second plate 6, the plates being parallel to each other and equidistant from an imaginary center plane C. A third plate 10 is perpendicular to the first and second plates. The inward-facing surfaces of the plates are coated with or support reflective surfaces 4, 8, 12 and 14. The reflective surfaces 12 or 14 are on opposite sides of the center plane. They may be separate surfaces, or merely separate portions of a single surface.

The principle of the invention may be understood by considering the paths of light beams from a source S positioned, for example, to the right of the center plane. Light beam 30 and any other light beams from the source A impinging on reflective surface 14 are reflected away from the source, as are some light beams such as light beam 31 impinging on reflective surface 12. However, light beams such as light beam 32 are reflected off reflective surface 12 to reflective surface 4 and thence back towards the source A and the observer O positioned near the line of the light beam. It will be apparent that light can only be reflected back towards the source S if it reflects off both reflective surfaces 12 and 4, and not off reflective surface 14.

Accordingly in the present invention one or preferably both of reflective surfaces 12 and 4 are tinted, so that light reflecting back to the source S becomes colored. One or both of reflective surfaces 8 and 14 may also be tinted, but in a different color so that different colors are reflected back to sources on different sides of the center plane.

When the light source is positioned in the center plane, then of course there is merely a straight reflection back from reflective surfaces 12 and 14, resulting in a mixture of the two colors being perceived by the observer O. However, when the source and the observer move to one side or the other of the center place, a colored reflection will be seen by the observer, indicating which side of the plane the source and observer are on.

The strength of the reflected signal relative to the source signal increases as the angle from the center plane increases, up to a maximum at 45 degrees, since more of the light reflects off surfaces 12 and 4 rather than off surface 12 only.

To minimize the occurrence of excessive internal reflection beyond 45 degrees from the center plane, resulting in color confusion, the plates 2 and 4 should preferably not extend from the plate 10 by a distance greater than the distance between plates 2 and 6. Generally speaking, the reflector of the present invention is not intended for optimum performance beyond a 45 degree angle from the center plane, although it may remain effective beyond 45 degrees to varying degrees depending on the specific design.

It will be readily apparent that the embodiment of FIG. 1 is only useful when the source and observer are in the plane perpendicular to all of the reflective surfaces, i.e. in the paper plane of FIG. 1. Otherwise, light cannot be reflected back to the source because reflective surfaces 12 or 14 as the case may be will reflect the light upwardly or downwardly relative to the source. For many applications, of course, this limitation of this embodiment is not a problem.

Figure 2:
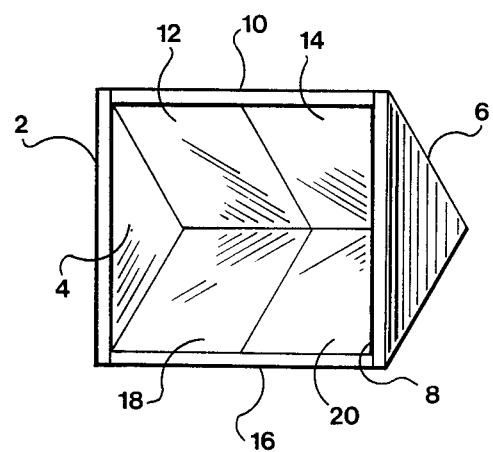
FIG. 2 is an oblique drawing of the preferred embodiment of the invention, as viewed from the right of the center plane.

In the preferred embodiment, illustrated in FIG. 2, this limitation is overcome by the addition of a fourth plate 16 with reflective surfaces 18 and 20. The first and second plates 2 and 6 are again parallel, plate 10 is perpendicular to them, and the fourth plate 16 is perpendicular to all three. As is well known and can be readily demonstrated, a light beam which reflects off, for example, surface 18 to surface 12 to surface 4 will then be reflected by surface 4 back towards the light beam source in a manner directly analogous to that illustrated in FIG. 1. The reflector element is preferably oriented such that the source and observer are normally near the plane which is at 45 degrees to the third and fourth plates 10 and 16.

Thus if one or both or preferably all three of the surfaces 18, 12 and 4 are tinted, then such a light beam would produce a colored signal to an observer positioned close to the line of the light beam.

In FIG. 2, the reflector element is illustrated as it would be seen from a viewpoint to the right of the center plane, i.e. the plane parallel and equidistant from reflective surfaces 4 and 8. It can be readily appreciated that some of the light directed towards the reflector from a source in line with the viewpoint would be reflected off surfaces 18, 12 and 4 (in any order) to produce a colored signal. Part of the light would be reflected off only one or two of the surfaces, for example reflecting off surfaces 18 and 12 and then off to the left of the center plane without contacting surface 4. None of the light which reflected off either or both of surfaces 14 and 20 would be reflected off surface 4 and back towards the source.

As in the case of the simple embodiment of FIG. 1, when the light source is positioned in the center plane, there is simple reflection back towards the source, off surfaces 18 and 12 and off surfaces 20 and 14, resulting in a mixture of colors being perceived. However, moving the source and the observer away from the center plane results in different colored signals being returned to the observer depending on which side of the center plane the source and observer are on.

One or both or preferably all three of reflective surfaces 20, 14 and 8 may be tinted in a different color from the tinting of surfaces 4, 12 and/or 18, or surfaces 20, 14 and 8 may be left untinted.

A number of variations on the invention are obvious and are within the scope of the invention. For example, the shape and structure of the reflector may be varied as desired as long as the essential relationship of reflective surfaces is unchanged. Similarly, the size of the reflector unit is immaterial; there may be one or more large reflector units, or a large number of very small reflector units in an array, as desired for the particular application.

Any known and suitable reflective material or coating and tinting means may be employed.

It is also obvious that the reflector unit has application not only in indicating the position of an observer and light source in relation to a stationary reflector, but also in indicating the angular orientation of a moving reflector unit in relation to a fixed observer and light source, or for that matter in relation to an also-moving observer and light source.

In most applications, the center plane will be vertical, but it is obvious that the reflector element could be positioned so that the center plane is horizontal or at any desired angle to the horizontal, as for example to indicate an optimum aircraft landing glide slope.

What I claim as my invention is:

1. A reflector element comprising first and second reflective surfaces facing each other equidistant from and parallel to an imaginary center plane, and a third reflective surface adjacent to and abutting perpendicularly said first and second reflective surfaces, in which at least one reflective surface is tinted on one side of the center plane.

2. A reflector element as recited in claim 1, further comprising a fourth reflective surface adjacent to and abutting perpendicularly said first, second and third reflective surfaces.

3. A reflector element as recited in claim 2, in which all of the reflective surfaces on the one side of the center plane are identically tinted.

4. A reflector element as recited in claim 2, in which at least one reflective surface is tinted on the other side of the center plane, the color of the tinting on the one side of the center plane being different from the color of the tinting on the other side.

5. A reflector element as recited in claim 2, in which all of the reflective surfaces are tinted, the color of the tinting on one side of the center plane being different from the color of the tinting on the other side of the center plane.

6. A reflector element as recited in claim 1, in which all of the reflective surfaces on the one side of the center plane are identically tinted.

7. A reflector element as recited in claim 1, in which at least one reflective surface is tinted on the other side of the center plane, the color of the tinting on the one side of the center plane being different from the color of the tinting on the other side.

8. A reflector element as recited in claim 1, in which all of the reflective surfaces are tinted, the color of the tinting on one side of the center plane being different from the color of the tinting on the other side of the center plane.

* * * * *